(12) United States Patent
Prochaska

(10) Patent No.: US 8,528,501 B2
(45) Date of Patent: Sep. 10, 2013

(54) PET GROOMING TOOL

(75) Inventor: Sascha Prochaska, Bloomsfiled, NJ (US)

(73) Assignee: The Hartz Mountain Corporation, Secaucus, NJ (US)

( * ) Notice: Subject to any disclaimer, the term of this patent is extended or adjusted under 35 U.S.C. 154(b) by 0 days.

(21) Appl. No.: 13/212,500

(22) Filed: Aug. 18, 2011

(65) Prior Publication Data
US 2013/0042816 A1 Feb. 21, 2013

(51) Int. Cl.
A01K 13/00 (2006.01)

(52) U.S. Cl.
USPC .............. 119/625; 119/611; 119/618

(58) Field of Classification Search
USPC ............ 119/625, 611, 613, 608, 609, 628, 119/618, 614, 616, 617, 623, 626, 630, 631, 119/632, 633; 132/219, 126, 129, 151, 152, 132/160
See application file for complete search history.

(56) References Cited

U.S. PATENT DOCUMENTS

| | | | | |
|---|---|---|---|---|
| 191,608 A | | 6/1877 | Miller | |
| 441,136 A | * | 11/1890 | Clements | 119/617 |
| 486,295 A | | 11/1892 | Pflueger | |
| 665,172 A | | 1/1901 | Carden | |
| 797,184 A | * | 8/1905 | Deneen | 30/31 |
| 820,292 A | * | 5/1906 | Dunbar | 403/4 |
| 851,567 A | * | 4/1907 | Sutherland | 132/150 |
| 1,061,014 A | | 5/1913 | Sawyer | |
| 1,085,063 A | | 1/1914 | Prouty et al. | |
| 1,305,226 A | * | 5/1919 | Kunkler | 132/152 |
| 1,381,804 A | * | 6/1921 | Crawford | 132/150 |
| 1,663,078 A | * | 3/1928 | Harper | 132/118 |
| 2,029,792 A | * | 2/1936 | Pluchino | 132/150 |
| 2,068,085 A | | 1/1937 | Stanley | |
| D154,784 S | | 8/1949 | Lazar | |
| 2,943,602 A | * | 7/1960 | Rundle | 119/650 |
| 2,961,997 A | | 11/1960 | Oliver | |
| D208,345 S | | 8/1967 | Battaglia | |
| 3,536,080 A | | 10/1970 | Player et al. | |
| 3,893,424 A | | 7/1975 | Casler | |
| 3,897,629 A | | 8/1975 | Liedtke | |
| 3,978,870 A | * | 9/1976 | Lin | 132/219 |
| 3,981,275 A | | 9/1976 | Schimoler | |

(Continued)

FOREIGN PATENT DOCUMENTS

DE 38 44 276 A1 10/1989

Primary Examiner — Yvonne Abbott
(74) Attorney, Agent, or Firm — Stroock & Stroock & Lavan LLP

(57) ABSTRACT

An improved pet grooming tool is provided for grooming pets and removing loose or detached hair from their fur coats, while removing substantially no or acceptably little live hair and without the need to include any blade portion for engaging the loose or dead hairs. The tool can also collect the removed hair as opposed to permitting most of it to fall to the floor. In a preferred embodiment of the invention, the grooming tool includes an elongated handle portion having proximal and distal ends, a head portion at the distal end of the handle, and a carding portion on the head. A tool axis extends in a proximal direction from the head to the proximal end and in preferred embodiments of the invention, corresponds to the direction in which the tool is drawn across the animal's coat (the grooming direction). The grooming tool also has a plurality of tines, with a generally triangular shape when viewed from their sides or top, such that they narrow when extending from base to tip.

33 Claims, 4 Drawing Sheets

(56) References Cited

U.S. PATENT DOCUMENTS

| | | | |
|---|---|---|---|
| D244,712 S | 6/1977 | Houston | |
| 4,357,043 A | 11/1982 | Towsend | |
| 4,663,841 A | 5/1987 | Custer | |
| 4,683,657 A | 8/1987 | Anderson et al. | |
| 4,709,475 A | 12/1987 | Phung | |
| 4,928,716 A | 5/1990 | Greene | |
| 4,970,990 A * | 11/1990 | Wilhelmi | 119/601 |
| 5,022,350 A | 6/1991 | Sequist | |
| 5,211,131 A | 5/1993 | Plyler | |
| 5,213,116 A | 5/1993 | Stein | |
| 5,339,840 A * | 8/1994 | Koppel | 132/151 |
| 5,353,817 A * | 10/1994 | Kantor et al. | 132/219 |
| 5,449,007 A | 9/1995 | Arnhols | |
| 5,485,807 A * | 1/1996 | Bertwell et al. | 119/632 |
| 5,704,376 A | 1/1998 | Ogunro | |
| 5,865,191 A * | 2/1999 | Kimeta | 132/210 |
| D422,760 S * | 4/2000 | Ticehurst | D30/159 |
| 6,082,307 A * | 7/2000 | Landreneau | 119/616 |
| 6,217,091 B1 * | 4/2001 | Whitney | 294/15 |
| 6,782,846 B1 | 8/2004 | Porter et al. | |
| 6,955,137 B2 * | 10/2005 | Dunn et al. | 119/625 |
| 7,077,076 B2 * | 7/2006 | Porter et al. | 119/625 |
| 7,509,926 B2 * | 3/2009 | Porter et al. | 119/625 |
| 7,536,789 B2 * | 5/2009 | Michel | 30/200 |
| 7,748,350 B2 * | 7/2010 | Vandervoet | 119/618 |
| 7,854,214 B2 * | 12/2010 | Khubani et al. | 119/625 |
| 8,042,492 B2 * | 10/2011 | Lin | 119/633 |

* cited by examiner

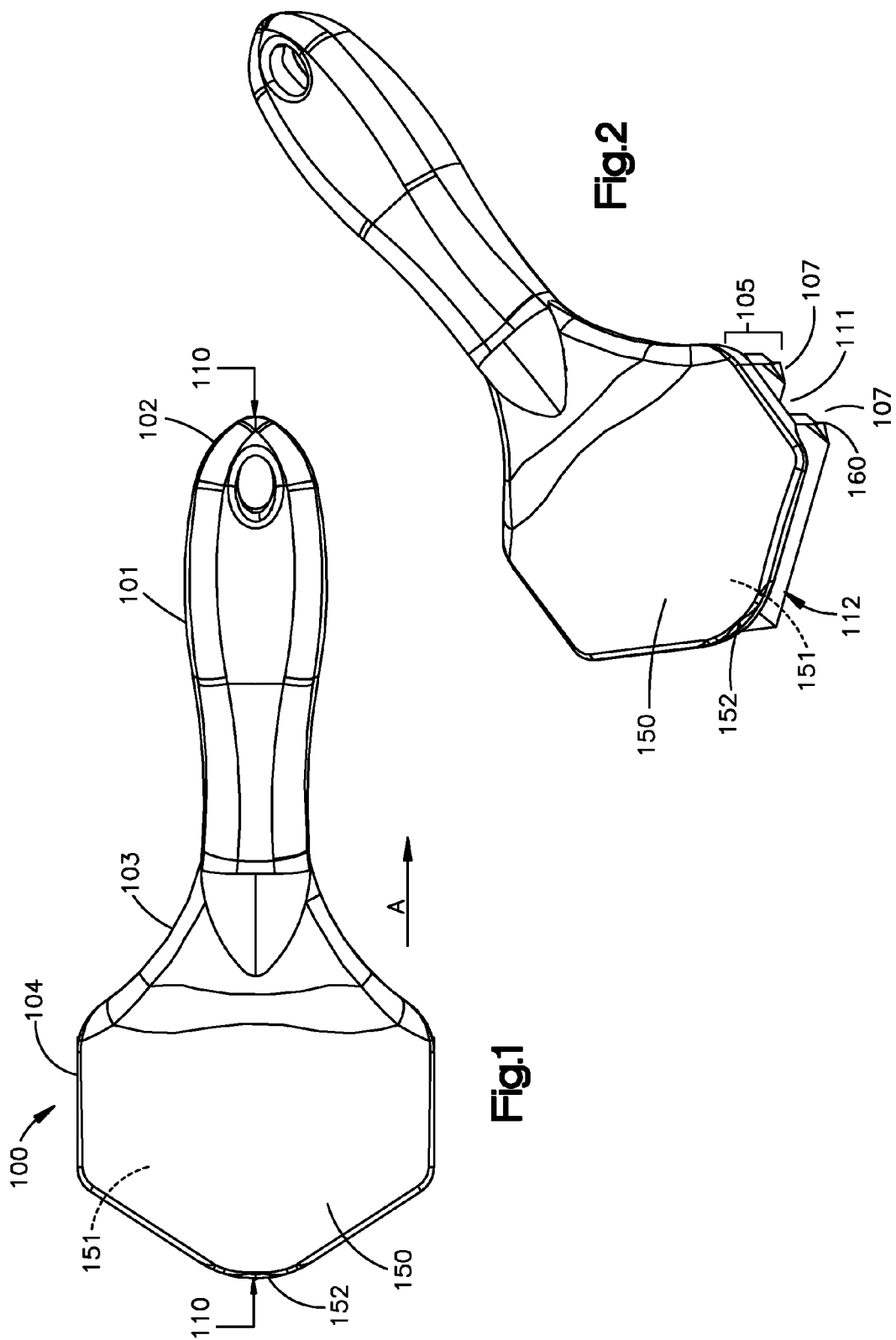

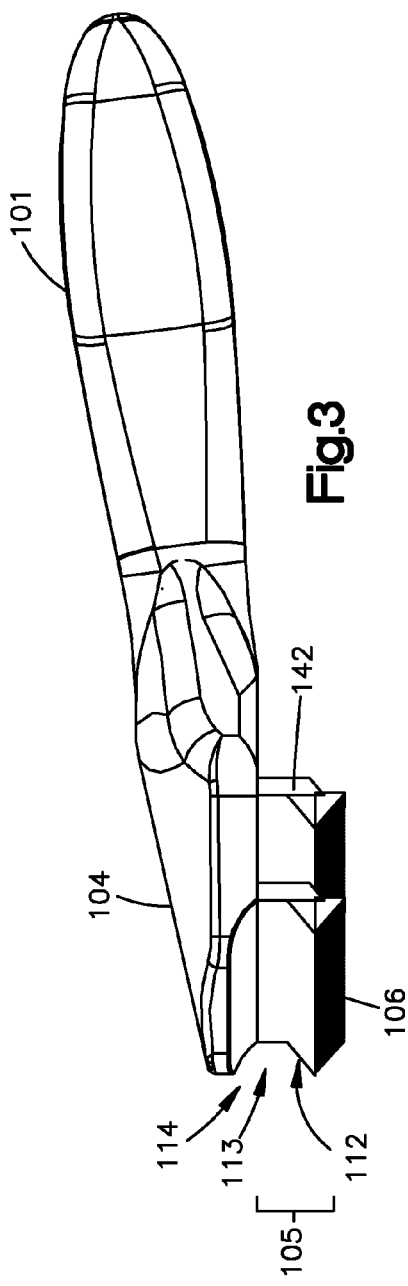
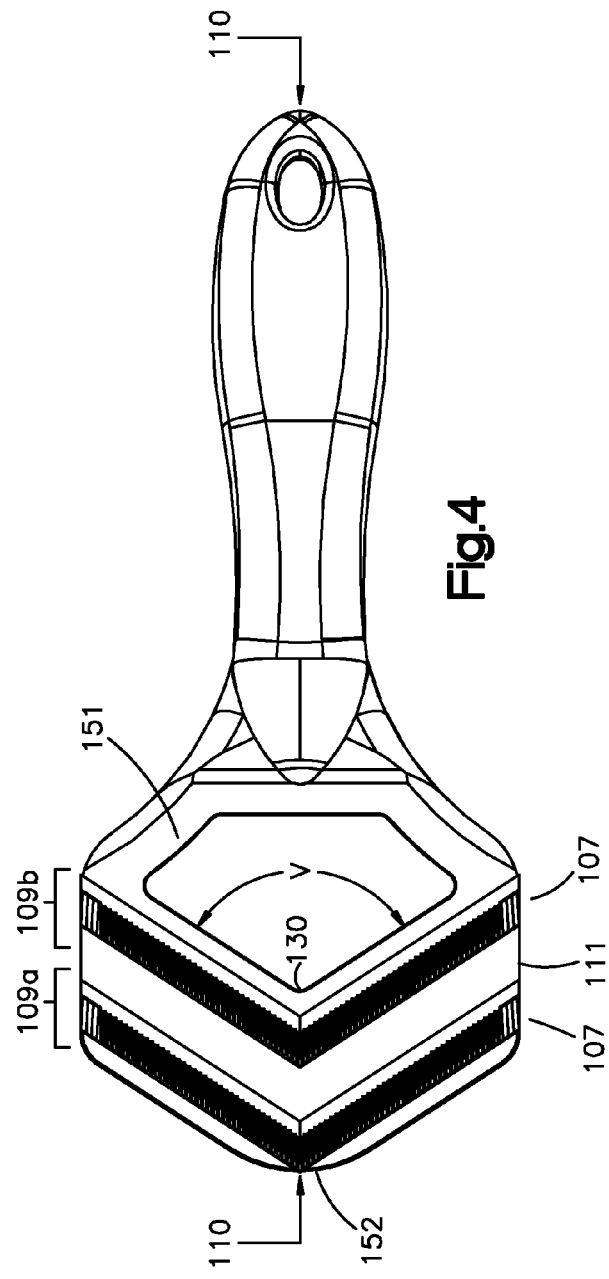

PET GROOMING TOOL

BACKGROUND OF THE INVENTION

The invention relates generally to pet grooming tools and more particularly to a tool for removing loose hairs from a pet's coat.

Grooming is an important part of caring for furry pets. Removing detached hair, such as the loose hair from an animal's undercoat, is generally desirable. Particularly with dogs and cats, whose coats tend to molt or shed hair, a tool that can remove detached or almost detached hairs, while leaving live, secure ones in place, has become increasingly important to owners of such pets. It limits the amount of hair the animal might otherwise shed indoors and/or in undesirable locations. Removing detached hair also serves to improve the appearance of pets, by making their fur coats look more kempt and clear.

Many pet owners and pet groomers employ combs, brushes and devices similar to tools for removing lint from clothing. Others employ a toothed blade that has been designed for use with electric animal grooming sheers. They pass the blade through a pet's fur coat to remove the detached hairs. Still others have taken to using such a toothed blade mounted to a handle, as, for example, the "Furminator De-Shedding tool" (disclosed in U.S. Pat. No. 7,509,926 and incorporated herein by reference), for perceived better gripping and handling of the toothed blade.

Some users of existing grooming tools feel they remove too much live hair from the animal's coat. This can occur if toothed blades including relatively sharp blade portions unintentionally cut and sever live hair or engage live hair strongly enough to undesirably remove it from the pet. Additionally, machining toothed clipper blades is an expensive process. Assembly of such de-shedding tools can be labor intensive, time consuming and/or expensive, such as when the handle is fitted with a slot for inserting the toothed blade and the toothed blade is aligned and then fastened in the slot.

Accordingly it is desirable to provide a grooming tool for a pet, such as a dog or cat, which overcomes shortcomings of existing pet grooming tools.

SUMMARY OF THE INVENTION

Generally speaking, in accordance with the invention, an improved pet grooming tool is provided for grooming pets and removing loose or detached hair from their fur coats, while removing substantially no or acceptably little live hair, and without the need to include any blade portion for engaging the loose or dead hairs. The tool can also collect the removed hair as opposed to permitting most of it to fall to the floor. In a preferred embodiment of the invention, the grooming tool includes an elongated handle portion having proximal and distal ends, a head portion at the distal end of the handle, and a carding portion on the head. A tool axis extends in a proximal direction from the head to the proximal end and, in preferred embodiments of the invention, corresponds to the direction in which the tool is drawn across the animal's coat (the grooming direction). The grooming tool also has a front, corresponding to the side that contacts the pet, and a back, opposite the front. From the perspective of looking at the front, it will also have a left side and a right side.

The carding portion can include a plurality of tines arranged in one or more rows. These rows can be V-shaped and/or have gaps therebetween, to help collect the groomed hairs into the vertex of the V and/or between the rows. In a preferred embodiment of the invention, over 50% of the removed hairs can be collected by the tool during grooming.

The functional portion of each tine, which engages the pet's coat, can be generally triangular (shark fin like) in side view, when observed from the left or right side, with a base that should be substantially aligned with the grooming direction towards the back, and a narrowed point-like tip portion towards the front. When observed from the proximal direction, with the tines pointing down, the tines can also be generally triangular, in that they should be wider at their base where they connect with the head and narrowed at the tip. In one embodiment of the invention, the tines are aligned with the tool axis and extend in the proximal direction, with gaps therebetween. The tip of each tine is the leading portion in contact with the animal and the wider base is at the connection of the tine to the head.

In one embodiment of the invention, the tines are spaced between about 0.75 and 1.25 mm apart (measured tine tip center to tine tip center), more preferably about 0.9 to 1.2 mm apart, most preferably about 1.109 mm apart.

To provide stronger tines, in side view, the ratio of the length of the base (L) of the tines and the height of the tines (H) (measured from base to tip) should be about L:H=1:2 to 2:1, more preferably about 1.5:1 to 1:1.5, most preferably about 1:1. When viewed from the grooming direction, the tines should be wider at their base than at the tip, preferably with a tip width ($W_T$) less than about 0.5 as wide as at the tine base ($W_B$), more preferably, less than about 0.25 as wide.

In one embodiment of the invention, the length of the base L is between about 5 and 7 mm, more preferably, between about 5.80 and 6.3 mm, most preferably, about 6.1 mm. The height of the tines H should be between about 5.0 and 5.2 mm, more preferably, between about 5.05 and 5.1 mm, most preferably, about 5.085 mm. The width of the base $W_B$ should be between about 0.5 and 0.7 mm, more preferably, between about 0.60 mm and 0.66 mm, most preferably, about 0.63 mm. The width of the tine tip $W_T$ should narrow to a point. While the tip narrows to a point, it should be understood that the tip is not unduly sharp so as to injure the pet being groomed. Additionally, the width of the gap $W_G$ between the tines should be between about 0.30 and 0.60 mm, more preferably about 0.40 and 0.50 mm, most preferably about 0.473 mm wide.

In one embodiment of the invention, the proximal leading edge of the tines, in the grooming direction, from the side perspective, can make a generally right angle with the base and/or tool axis and the distal edge can slope towards the base at a decline. It has been determined that by providing tines constructed in this manner, the tines can be thin and closely spaced in the grooming direction, in a manner surprisingly well designed to form an easy path through a pet's coat and maximize removal of shed hair, yet also strong and durable to resist wear and breakage.

The first and optional second V-shaped comb sections can span most or all, preferably in parallel, the width of the head portion. The vertex of each V-shaped comb section can be oriented along the center axis of the handle portion and should point away from the grooming direction. The angle of the arms of the rows of tines of the V-shaped comb section can be about 90 to 130 degrees, more preferably about 100 to 120 degrees, most preferably about 114 degrees. The actual vertex need not be a perfect V, but can be rounded or flattened as desired. The opening of each V-shaped comb section can be oriented axially in the direction of the proximal end of the handle portion. The tines can be oriented to angle away from the head portion in a direction towards the proximal end of the handle portion. The head portion can also include a gap between first and second V-shaped comb sections to help collect the pet's fur. In one embodiment of the invention, the rows are spaced between about 14.00 mm and 16.00 mm apart, more preferably about 15.00 mm to 15.50 mm apart, most preferably, about 15.126 mm.

The carding portion can be constructed to slope inward radially above the V-shaped comb section(s), so as to create a distally pointing wedge shape in combination with the angled tines. This can simultaneously create a radial groove below a lip of the head section. Additionally or alternatively, the lengths and/or widths of the tines of the one V-shaped row are optionally different lengths and/or widths than the tines of another V-shaped row. Furthermore, the head portion may optionally include additional comb sections.

The angled tines and the V-shaped comb sections are preferably oriented in a manner so that pulling the carding tool by the handle portion in the proximal grooming direction, while the carding portion is engaged with an animal's fur, results in the fur being funneled into the vertex of the V-shaped comb portions where the angled tines catch detached hairs, while substantially allowing live hair to pass therethrough.

In preferred embodiments of the invention, the entire tool can be molded, in one or more molds, from various plastics and resins providing selected flex modulus, strength and durability. Optional molding materials include nylon, ABS plastic, acetal and polycarbonate, with the preferred material being nylon. Optionally, different parts of the tool can be molded from different materials. For example, the handle can be made softer and the tines stronger and harder, or the reverse. The tines are preferably made from a nonmetallic material, such as a plastic or resin. The tines can be molded from different material than the remainder of the head. In another embodiment of the invention, the combs can be oriented in different directions or of different shapes.

An improved method for grooming pets and removing significant amounts of detached hair from their fur coats when they shed, while substantially not removing live secure hair is also provided. The method comprises providing a carding tool as discussed above and grooming the pet with the tool by pulling the tool in the proximal direction of the handle axis, with the handle generally parallel to the pet's body, so the carding portion of the head rides with the correct orientation. In one preferred embodiment of the invention, the two rows of tines help the user orient the head properly with both rows in contact with the pet.

Accordingly, it is an object of the invention to provide an improved grooming tool for pets, such as dogs and cats, which overcomes drawbacks of the prior art.

Another object of the invention is to provide an improved grooming tool for pets, having relatively high efficiency while avoiding damage.

Yet another object of the invention is to provide an improved grooming tool for pets, which is easier and less expensive to manufacture than other grooming tools.

Still other objects and advantages of the invention will in part be obvious and will in part be apparent from the specification and drawings.

The invention accordingly comprises the several steps and the relation of one or more of such steps with respect to each of the others, and the article possessing the features, properties, and the relation of elements, which are exemplified in the following detailed disclosure, and the scope of the invention will be indicated in the claims.

BRIEF DESCRIPTION OF THE DRAWINGS

For a fuller understanding of the invention, reference is made to the following description, taken in connection with the accompanying drawings, in which:

FIG. 1 is a top plan view of an improved grooming tool constructed in accordance with a preferred embodiment of the invention;

FIG. 2 is a perspective view of the improved grooming tool of FIG. 1;

FIG. 3 is a side view of the improved grooming tool of FIG. 1;

FIG. 4 is a bottom view of the improved grooming tool of FIG. 1;

DETAILED DESCRIPTION OF THE PREFERRED EMBODIMENTS

Figure 5:
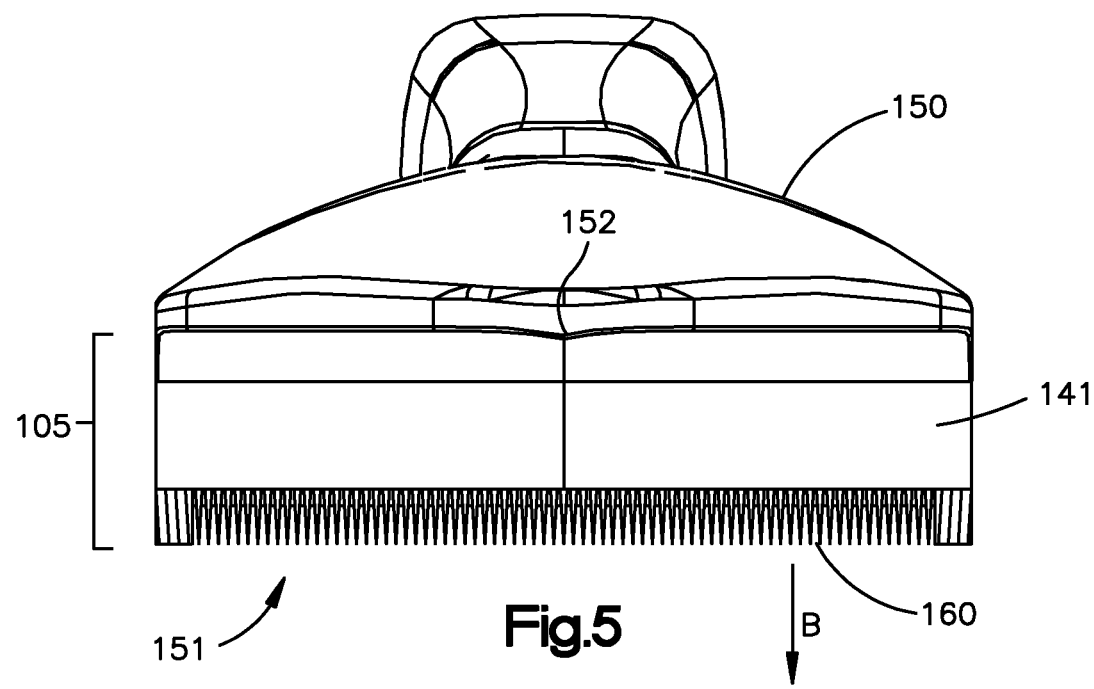
FIG. 5 is a front view of the improved grooming tool of FIG. 1.
Figure 6:
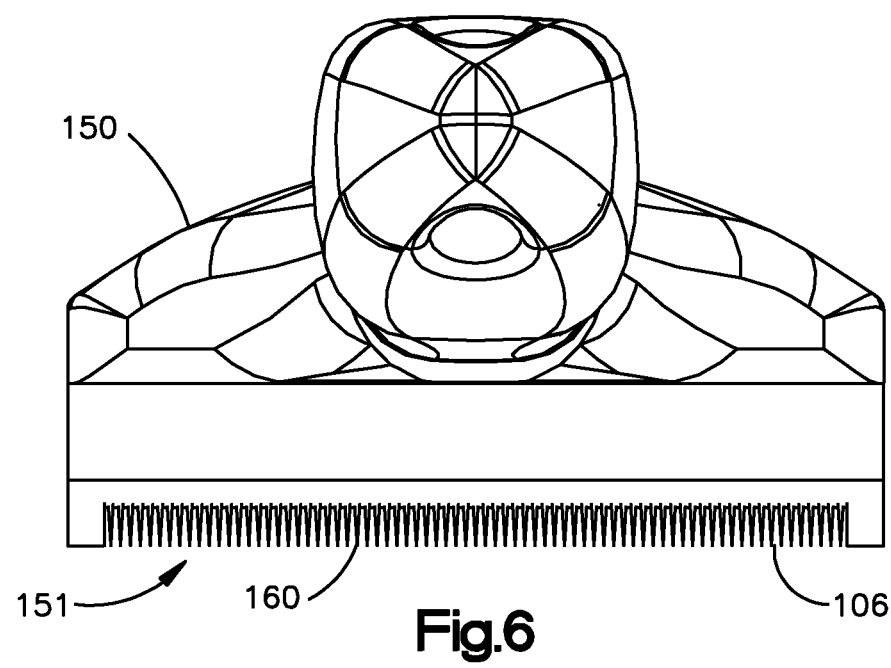
FIG. 6 is an end view of the improved grooming tool of FIG. 1.
Figure 7A:
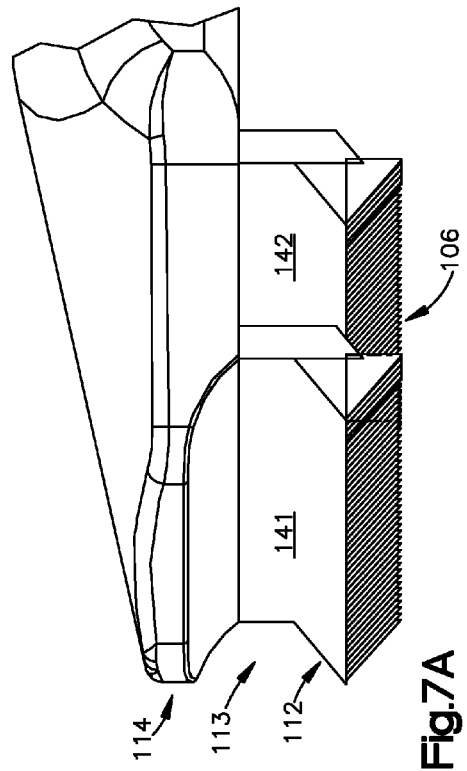
FIG. 7 is a partial enlarged view of the improved grooming tool of FIG. 1.
Figure 7B:
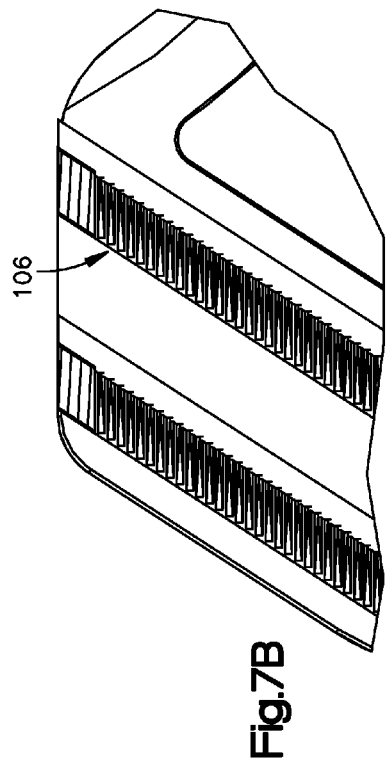

An improved carding tool constructed in accordance with preferred embodiments of the invention is shown generally as a carding tool 100 in FIGS. 1-7. Carding tool 100 includes an elongated handle portion 101 having a proximal end 102 and a distal end 103. A head portion 104 is present at distal handle end 103. Head 104 includes a top side 150, a bottom side 151 and a distal end 152. A tool axis 110 extends proximally from distal end 152 of head 104 to proximal end 103 of handle 101 and corresponds to a preferred grooming direction for using tool 100 on a pet.

Head 104 includes a carding portion 105. Carding portion 105 preferably extends from head 104 in a generally perpendicularly downward direction from tool axis 110. However, in alternative embodiments of the invention, it can also extend out at other angles that maximizes use and effectiveness of carding tool 100 for selected applications. In other embodiments of the invention, head 104 can include a rotating feature, such that the orientation of carding portion 105 can be rotated with respect to tool axis 110 into a selected orientation. In certain preferred embodiments of the invention, carding tool 100 is designed to be placed on a pet in the general direction of an arrow B, generally perpendicular to tool axis 110 and then moved along the pet's coat in the grooming direction of an arrow A, which is generally parallel to tool axis 110.

Carding portion 105 includes a pair of generally parallel walls 141 and 142 extending from head 104 in the general direction of arrow B. A plurality of tines 106 are located on and extend from walls 141 and 142 in a pair of tine rows 107. Rows 107 are preferably V-shaped, with the V pointing in a direction opposite that of arrow A. As shown in tool 100, tines 106 and walls 141 and 142 define a first and an optional second pair of V-shaped comb sections 109*a* and 109*b*.

Figure 8:
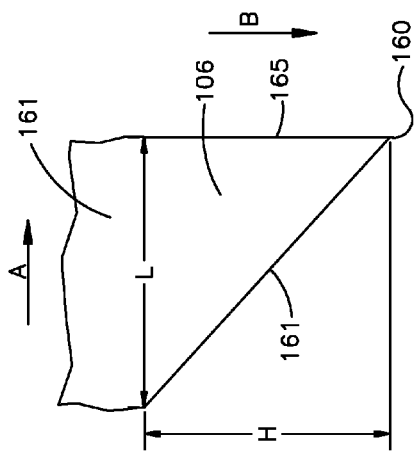
FIG. 8 is an partial enlarged side view of a tine of the improved grooming tool of FIG. 1 constructed in accordance with a preferred embodiment of the invention.

Referring to FIG. 8, tines 106 have a wide tine base 161 with a base length L extending in the direction of arrow A at the position where tine 106 extends from wall 141 or 142. Tines 106 then taper to a tip portion 160 as it extends from walls 141 or 142, forming, from a side perspective, a triangularly shaped, shark fin-like shape. In a preferred embodiment of the invention, tines 106 form a generally right triangle, wherein a leading (when moved in the grooming direction of arrow A) tine edge 165 extends in the direction of arrow B from base 161. Tines 106 can also include a sloping trailing edge 167 which extends at a decline from base 161 to tine tip 160. Alternatively, other triangular shaped tines or other shapes with wider bases than tips may be used in preferred embodiments of the invention.

In the side perspective, the ratio of the length of base 161 (L) of tines 106, where they connect to walls 141 or 142 and the height of the tines (H) (measured from base 161 to tip 160) should be about L:H=1:2 to 2:1, more preferably about 1.5:1 to 1:1.5, most preferably about 1:1.

In one embodiment of the invention, the length of the base 161 (L) is between about 5 and 7 mm, more preferably, between about 5.80 and 6.3 mm, most preferably, about 6.1 mm. The height of the tines H should be between about 5.0 and 5.2 mm, more preferably, between about 5.05 and 5.1 mm, most preferably, about 5.085 mm. The width of the base $W_B$ should be between about 0.5 and 0.7 mm, more preferably, between about 0.60 mm and 0.66 mm, most preferably, about 0.63 mm. The width of the tine tip $W_T$ should narrow to a point. While the tip narrows to a point, it should be understood that the tip is not unduly sharp so as to injure the pet being groomed.

Figure 9:
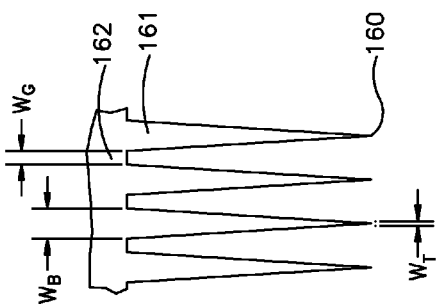
FIG. 9 is an partial enlarged end view of the tine of FIG. 8

Referring to FIG. 9, when viewed from the end, in the direction of arrow A, tines 106 should be wider at their base 161 than at tip 160, preferably with a tip width ($W_T$) less than about 0.5 as wide as at the tine base ($W_B$), more preferably, less than about 0.25 as wide. In one embodiment of the invention, the proximal edge of the tines, from the side perspective, can make a generally right angle with the base and/or tool axis and the distal edge can slope towards the base at a decline. It has been determined that by providing tines constructed in this manner, the tines can be thin and closely spaced in the grooming direction, in a manner surprisingly well designed to form an easy path through a pet's coat and maximize removal of shed hair, yet also strong and durable to resist wear and breakage. Additionally, tines 161 are preferably spaced with a gap 162 between their bases. Gap 162 has a preferred gap width (Wg) of about 0.30 and 0.60 mm, more preferably about 0.40 and 0.50 mm, most preferably about 0.473 mm wide.

First and optional second V-shaped comb sections 109a and 109b can span in parallel, the width of head portion 104 of carding tool 100. A vertex 130 of each V-shaped comb section 109a and 109b can be oriented along center axis 110 of handle portion 101. The angle (V) of vertex 130 can be about 90 to 130 degrees, more preferably about 100 to 115 degrees, most preferably about 114.16 degrees. Vertex 130 of each V-shaped comb section can be oriented along the center axis of the handle portion and should point away from the direction the tool is dragged across the animal's coat. The opening of each V-shaped comb section 109a and 109b can be oriented axially in the direction of proximal end 102 of the handle portion 101. Tines 106 can be oriented to angle away from head portion 104 in a direction towards proximal end 102 of handle portion 104. Head portion 104 can also include a gap 111 between first and second V-shaped comb sections 109a and 109b to optimize access to a pet's fur. First and second V-shaped comb sections 109a and 109b can be spaced between about 14.00 mm and 16.00 mm apart, more preferably about 15.00 mm to 15.50 mm apart, most preferably, about 15.126 mm apart to form gap 111.

Carding portion 105 can be constructed to slope inward radially above the V-shaped comb section(s), so as to create a distally pointing wedge shape 112 in combination with the angled tines. This can simultaneously create a radial groove 113 below a lip 114 of head 104. In alternative embodiments, wedge 112 and groove 113 are not required. Additionally or alternatively, the lengths and/or widths of the tines 106 of the one V-shaped comb section 109a are optionally different lengths and/or widths than the tines 106 of another V-shaped comb section 109b. Furthermore, the lengths and/or widths of the one V-shaped comb section 109a are optionally different lengths and/or widths than the other V-shaped comb section 109b. Additionally, the head portion 104 may optionally include more or less V-shaped comb sections than the first and second comb sections 109a and 109b of the preferred embodiment. In alternative embodiments, comb portions 109a and 109b may have a curved shape, rather than a V shape.

In a preferred embodiment, first and second V-shaped comb sections 109a and 109b are disengageable from carding portion 105, to allow for easy cleaning and/or replacement. Alternatively, first and second V-shaped comb sections 109a and 109b may be permanently part of carding portion 105. In other embodiments, carding portion 105 may itself be disengageable from head portion 104 and/or rotatable into different orientations. Whether or not disengageable, the tines and head can be formed from different material, such as making the tines harder than the remainder of the head.

Angled tines 106 and V-shaped comb sections 109a and 109b are preferably oriented in a manner so that pulling carding tool 100 by handle portion 101 in the direction of arrow A, while carding portion 105 is engaged with an animal's fur, results in the loose fur being funneled into V-shaped comb portions 109a and 109b where angled tines 106 catch detached hairs, while allowing live hair to pass therethrough. Wedge 112 is preferably constructed and formed so as to aid the user in passing carding tool 100 quickly back through the fur of the animal in preparation for more detached-hair removal, while not requiring the user to disengage carding tool 100 from the animal's fur coat.

Preferably, handle portion 101 and head portion 104 are made of a durable copolymer, more preferably a thermoplastic elastomer, such as, for example, a mix of plastic and rubber, which can be easily formed through injection molding. Carding portion 105 is preferably made of a high strength nylon. In other embodiments, alternative materials may be used for handle portion 101, head portion 104 and carding portion 105, such as ABS plastic, acetal and polycarbonate. However, the preferred material is nylon. Tines 106 are preferably made from a nonmetallic material, such as a plastic or resin.

A method of grooming a pet and efficiently removing detached and/or loose hair from a pet's fur coat, while only removing an acceptably small amount of live attached hair, is provided by employing carding tool 100. The method comprises providing carding tool 100 as discussed above and grooming the pet with the tool by pulling the tool generally along line 110 in the direction of arrow A with handle portion 101 and head 104 generally parallel to the pet's body, so carding portion 105 rides with the correct orientation. Alternatively and/or additionally, carding tool 100 may be pulled by handle portion 101 as described above in the general direction of growth of the animal's hair, if other than in the direction from head to tail. In one preferred embodiment of the invention, first and second V-shaped comb sections 109a and 109b help the user orient head portion 104 properly with both rows 107 in contact with the pet.

It will thus be seen that the objects set forth above, among those made apparent from the preceding description, are efficiently attained and, since certain changes may be made in carrying out the above method and in the article set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A grooming tool for grooming an animal's coat to remove loose or detached hairs, comprising:
    a handle portion having proximal and distal ends, a head portion at the distal end of the handle portion, and a grooming portion extending from the head portion;
    the grooming portion comprising a plurality of tines arranged in at least a first row which may or may not be linear, the plurality of tines constructed and arranged in a manner adapted to engage the loose and detached hairs when the grooming tool is passed in a grooming direction through the animal's coat and substantially remove them from the animal, substantially without cutting or plucking secure, live hairs from the animal's coat;
    the plurality of tines having a base substantially aligned with the grooming direction, a height extending from the base to a tine tip, with the length at the base in the grooming direction longer than at the tip, the tines also having a tine side, sloping from the tip to the base in a direction aligned with the grooming direction, the tines also wider at their base in a direction perpendicular to the grooming direction than at the tine tip, such that the tips of adjacent tines are farther apart than the bases of adjacent tines,
    wherein the first row of tines is V-shaped and comprises an opening and a vertex, the opening substantially faces the grooming direction, and the vertex points in a direction substantially opposite the grooming direction.

2. The grooming tool of claim 1, wherein the first row extends substantially across a width of the head portion.

3. The grooming tool of claim 2, comprising at least a second row of tines, located substantially parallel to the first row, with a row gap between the first row and the second row.

4. The grooming tool of claim 3, wherein:
    the at least one first row and the at least one second row are spaced between about 14.00 mm and 16.00 mm apart.

5. The grooming tool of claim 1, wherein the plurality of the tines tips are spaced between about 0.75 mm and about 1.25 mm apart at their centers.

6. The grooming tool of claim 1, wherein the plurality of tines are spaced between 0.9 mm and about 1.2 mm apart at their centers.

7. The grooming tool of claim 1, wherein the tines are spaced about 1.1 mm apart.

8. The grooming tool of claim 1, wherein the ratio of the length of the base to the height of the tines is approximately 1:2 to 2:1.

9. The grooming tool of claim 1, wherein the ratio of the length of the base to the height of tines is approximately 1.5:1 to 1:1.5.

10. The grooming tool of claim 1, wherein the ratio of the length of the base and height of the tines is about 1:1.

11. The grooming tool of claim 1, wherein the tines are made from a non-metallic material.

12. The grooming tool of claim 1, wherein the head portion does not include any blade portion for engaging the loose or dead hairs.

13. The grooming tool of claim 1, wherein the vertex and opening define an angle of approximately 90 to 130 degrees.

14. The grooming tool of claim 1, wherein the vertex and opening define an angle of approximately 100 to 120 degrees.

15. The grooming tool of claim 1, wherein the vertex and opening define an angle of approximately 114 degrees.

16. The grooming tool of claim 1, comprising a radial groove located between a lip of the head portion and a base of the plurality of tines, the at least one V-shaped row of tines and the radial groove defining a wedge section, wherein the wedge section is oriented substantially opposite a grooming direction.

17. The grooming tool of claim 1, wherein the plurality of tines and the at least one first V-shaped row are oriented and configured in a manner so that pulling the grooming tool by the handle portion in the grooming direction, while the grooming portion is engaged with an animal's fur, results in the collected loose or dead hairs being funneled through an open end of the at least one first V-shaped row toward a vertex of the at least one first V-shaped row, while substantially allowing live hairs to pass therethrough.

18. The grooming tool of claim 1, wherein the first row of tines is disengageable from, and reengageable to, the grooming tool.

19. The grooming tool of claim 1, wherein at least one of the grooming portion and the head portion is rotatable to allow proper orientation of the at least one first row of tines with respect to the fur, while providing a plurality of angles from which the handle portion can be held.

20. The grooming tool of claim 1, wherein the portion of the tines extending from their base have substantially the shape of a right-angled triangle, when viewed from a direction perpendicular to the grooming direction.

21. The grooming tool of claim 1, wherein the length of the base of the tines is between about 5.0 and 7.0 mm.

22. The grooming tool of claim 1, wherein the length of the base of the tines is between about 5.80 and 6.3 mm.

23. The grooming tool of claim 1, wherein the length of the base of the tines is about 6.1 mm.

24. The grooming tool of claim 1, wherein the height of the tines is between about 5.0 and 5.2 mm.

25. The grooming tool of claim 1, wherein the height of the tines is between about 5.05 and 5.1 mm.

26. The grooming tool of claim 1, wherein the height of the tines is about 5.085 mm.

27. The grooming tool of claim 1, wherein the width of the base of the tines is between about 0.5 and 0.7 mm.

28. The grooming tool of claim 1, wherein the width of the base of the tines is between about 0.60 mm and 0.66 mm.

29. The grooming tool of claim 1, wherein the width of the base of the tines is about 0.63 mm.

30. The grooming tool of claim 1, wherein the width of the gap between the tines is about 0.30 and 0.60 mm wide.

31. The grooming tool of claim 1, wherein the width of the gap between the tines is about 0.4 and 0.50 mm wide.

32. The grooming tool of claim 1, wherein the width of the gap between the tines is about 0.473 mm wide.

33. A method for grooming animals and removing significant amounts of loose and detached hair from their coats when they shed, while substantially not removing live secure hair, comprising providing the grooming tool of claim 1 and drawing it, in the grooming direction, through the animal's coat.

* * * * *